(12) United States Patent
Gu et al.

(10) Patent No.: US 11,295,514 B2
(45) Date of Patent: Apr. 5, 2022

(54) INVERSE RENDERING OF A SCENE FROM A SINGLE IMAGE

(71) Applicant: NVIDIA Corporation, Santa Clara, CA (US)

(72) Inventors: Jinwei Gu, San Jose, CA (US); Kihwan Kim, Campbell, CA (US); Jan Kautz, Westford, MA (US); Guilin Liu, San Jose, CA (US); Soumyadip Sengupta, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 16 days.

(21) Appl. No.: 16/685,538

(22) Filed: Nov. 15, 2019

(65) Prior Publication Data

US 2020/0160593 A1 May 21, 2020

Related U.S. Application Data

(60) Provisional application No. 62/768,591, filed on Nov. 16, 2018.

(51) Int. Cl.
*G06T 15/50* (2011.01)
*G06T 9/00* (2006.01)
(Continued)

(52) U.S. Cl.
CPC ......... *G06T 15/506* (2013.01); *G06N 3/0454* (2013.01); *G06N 3/08* (2013.01); *G06T 9/002* (2013.01); *G06T 2215/16* (2013.01)

(58) Field of Classification Search
CPC combination set(s) only.
See application file for complete search history.

(56) References Cited

U.S. PATENT DOCUMENTS

2011/0227922 A1* 9/2011 Shim .................. G06T 15/50
345/426
2015/0332512 A1* 11/2015 Siddiqui .............. G06T 17/20
345/633
(Continued)

OTHER PUBLICATIONS

Barron, J.T., et al., "Shape, illumination, and reflectance from shading," IEEE Transactions on Pattern Analysis and Machine Intelligence (TPAMI), 2015.
(Continued)

*Primary Examiner* — Andrew G Yang
(74) *Attorney, Agent, or Firm* — Leydig, Voit & Mayer, Ltd.

(57) ABSTRACT

Inverse rendering estimates physical scene attributes (e.g., reflectance, geometry, and lighting) from image(s) and is used for gaming, virtual reality, augmented reality, and robotics. An inverse rendering network (IRN) receives a single input image of a 3D scene and generates the physical scene attributes for the image. The IRN is trained by using the estimated physical scene attributes generated by the IRN to reproduce the input image and updating parameters of the IRN to reduce differences between the reproduced input image and the input image. A direct renderer and a residual appearance renderer (RAR) reproduce the input image. The RAR predicts a residual image representing complex appearance effects of the real (not synthetic) image based on features extracted from the image and the reflectance and geometry properties. The residual image represents near-field illumination, cast shadows, inter-reflections, and realistic shading that are not provided by the direct renderer.

20 Claims, 15 Drawing Sheets

(51) Int. Cl.
*G06N 3/08* (2006.01)
*G06N 3/04* (2006.01)

(56) References Cited

U.S. PATENT DOCUMENTS

| | | | | |
|---|---|---|---|---|
| 2018/0174275 | A1* | 6/2018 | Bourdev | H04N 19/197 |
| 2018/0253869 | A1* | 9/2018 | Yumer | G06F 30/00 |
| 2018/0260975 | A1* | 9/2018 | Sunkavalli | G06T 7/00 |
| 2018/0350110 | A1* | 12/2018 | Cho | G06N 3/04 |
| 2019/0304172 | A1* | 10/2019 | Ha | G06T 15/40 |
| 2019/0347526 | A1* | 11/2019 | Sunkavalli | G06K 9/46 |
| 2020/0380739 | A1* | 12/2020 | Ansorregui | G06F 21/606 |

OTHER PUBLICATIONS

Bell, S., et al., "Intrinsic images in the wild," ACM Transactions on Graphics (TOG), 33(4):159, 2014.

Chaitanya, C.R.A., et al., "Interactive reconstruction of monte carlo image sequences using a recurrent denoising autoencoder," ACM Transactions on Graphics (TOG), 36(4):98, 2017.

Che, C., et al., Inverse transport networks, arXiv preprint arXiv:1809. 10820, 2018.

Eigen, D., et al., "Predicting depth, surface normal and semantic labels with a common multi-scale convolutional architecture," In International Conference on Computer Vision (ICCV), pp. 2650-2658, 2015.

Fu, H., et al., "Deep ordinal regression network for monocular depth estimation," In IEEE Conference on Computer Vision and Pattern Recognition (CVPR), 2018.

Gardner, M.A., et al., "Learning to predict indoor illumination from a single image," ACM Transactions on Graphics (TOG), 36(6):176, 2017.

Georgoulis, S., et al., "DeLight-Net: Decomposing reflectance maps into specular materials and natural illumination," arXiv preprint arXiv:1603.08240, 2016.

Hold-Geoffrey, Y., et al., "Deep outdoor illumination estimation," In IEEE Conference on Computer Vision and Pattern Recognition (CVPR), vol. 2, 2017.

Karsch, K., et al., "Rendering synthetic objects into legacy photographs," In ACM Transactions on Graphics (SIGGRAPH Asia), pp. 157:1-157:12, 2011.

Kato, H., et al., "Neural 3D mesh renderer," In IEEE Conference on Computer Vision and Pattern Recognition (CVPR), pp. 3907-3916, 2018.

Khan, E.A., et al., "Image-based material editing," ACM Transactions on Graphics (TOG), 25(3):654-663, 2006.

Kim, K., et al., "A lightweight approach for on-the-fly reflectance estimation," In International Conference on Computer Vision (ICCV), pp. 20-28, 2017.

Lafortune, E.P., et al., "Using modified Phong reflectance model for physically based rendering," 1994.

Lettry, L., et al., "DARN: a deep adversarial residual network for intrinsic image decomposition," In IEEE Workshop on Applications of Computer Vision (WACV) 2018.

Li, T.M., et al., "Differentiable monte carlo ray tracing through edge sampling," 37(6):222:1-222:11, 2018.

Li, Z., et al., "CGIntrinsics: Better intrinsic image decomposition through physically-based rendering," European Conference on Computer Vision (ECCV), 2018.

Li, Z., et al., "Learning intrinsic image decomposition from watching the world," In IEEE Conference on Computer Vision and Pattern Recognition (CVPR), 2018.

Li, Z., et al., "Materials for masses: SVBRDF acquisition with a single mobile phone image," In European Conference on Computer Vision (ECCV), 2018.

Li, Z., et al., "Learning to reconstruct shape and spatially-varying reflectance with a single image," In ACM Transactions on Graphics (SIGGRAPH Asia), 2018.

Liu, G., et al., "Material editing using a physically based rendering network," In International Conference on Computer Vision (ICCV), 2017.

Lombardi, S., et al., "Reflectance and illumination recovery in the wild," IEEE Transactions on Pattern Analysis and Machine Intelligence (TPAMI) 38(1):129-141, 2016.

Meka, A., et al., "LIME: Live intrinsic material estimation," In IEEE Conference on Computer Vision and Pattern Recognition (CVPR), Jun. 2018.

Narihira, T., et al., "Direct intrinsics: Learning albedo-shading decomposition by convolutional regression," In International Conference on Computer Vision (ICCV), pp. 1-9, 2015.

Silberman, P.K.N., et al., "Indoor segmentation and support inference from RGBD images," In European Conference on Computer Vision (ECCV), 2012.

Nestmeyer, T., et al., "Reflectance adaptive filtering improves intrinsic image estimation," In IEEE Conference on Computer Vision and Pattern Recognition (CVPR), p. 4, 2017.

Oxholm, G., et al., "Shape and reflectance from natural illumination," In European Conference on Computer Vision (ECCV), pp. 528-541, Springer, 2012.

Prados, E., et al., "Shape from shading," In Handbook of mathematical models in computer vision, pp. 375-388, Springer, 2006.

Ronneberger, O., et al., "U-NET: Convolutional networks for biomedical image segmentation," In International Conference on Medical image computing and computer-assisted intervention (MICCAI), pp. 234-241, Springer, 2015.

Sengupta, S., et al., "Sfsnet: Learning shape, reflectance and illuminance of faces in the wild," In IEEE Conference on Computer Vision and Pattern Recognition (CVPR), 2018.

Shelhamer, E., et al., "Scene intrinsics and depth from a single image," In International Conference on Computer Vision, Workshops (ICCV-W), pp. 37-44, 2015.

Shi, J., et al., "Learning nonlambertian object intrinsics across shapenet categories," In IEEE Conference on Computer Vision and Pallern Recognition (CVPR), pp. 5844-5853, 2017.

Shotton, J., et al., "Scene coordinate regression forests for camera relocalization in rgb-d images," In IEEE Conference on Computer Vision and Pattern Recognition (CVPR), pp. 2930-2937, 2013.

Shu, Z., et al., "Neural face editing with intrinsic image disentangling," In IEEE Conference on Computer Vision and Pattern Recognition (CVPR), pp. 5444-5453, 2017.

Taniai, T., et al., "Neural inverse rendering for general reflectance photometric stereo," In Int'l Conf. on Machine Learning (ICML), pp. 20-28, 2017.

Tappen, M.F., et al., "Recovering intrinsic images from a single image," In Advances in Neural Information Processing Systems (NIPS), pp. 1367-1374, 2003.

Tunwattanapoing, B., et al., "Interactive image-based relighting with spacially-varying lights," In ACM Transactions on Graphics (SIGGRAPH), 2009.

Wang, T., et al., "Joint material and illumination estimation from photo sets in the wild," In International Conference on 3D Vision (3DV), pp. 22-31, 2018.

Weber, H., et al., "Learning to estimate indoor lighting from 3d objects," In International Conference on 3D Vision (3DV).

Xu, Z., et al., "Deep image-based relighting from optimal sparse samples," ACM Transactions on Graphics (TOG), 37(4):126, 2018.

Yu, Y., et al., "Inverserendernet: Learning single image inverse rendering," In IEEE Conference on Computer Vision and Pattern Recognition (CVPR), pp. 3155-3164, 2019.

Zhang, E., et al., "Emptying, refurbishing, and relighting indoor spaces," ACM Transactions on Graphics (TOG), 35(6):174, 2016.

Zhang, E., et al., "Discovering point lights with intensity distance fields," In IEEE Conference on Computer Vision and Pattern Recognition (CVPR), pp. 6635-6643, 2018.

Zhou, H., et al., "Label denoising adversarial network (LDAN) for inverse lighting of face images," In IEEE Conference on Computer Vision and Pattern Recognition (CVPR), 2017.

Zhou, T., et al., "Learning data-driven reflectance priors for intrinsic image decomposition," In International Conference on Computer Vision (ICCV), pp. 3469-3477, 2015.

(56) References Cited

OTHER PUBLICATIONS

Zhuo, W., et al., "Indoor scene structure analysis for single image depth estimation," In IEEE Conference on Computer Vision and Pattern Recognition (CVPR), pp. 614-622, 2015.

* cited by examiner

Image $I$

Normal $N$

Albedo $A$

Lighting $L$

Reconstructed Image $I$

Glossiness $G$

*I*

$I_d$ $I_s$

Image annotated with pair-wise judgements
260

"Point 1 is darker" (1):

"About the same" (E):

INVERSE RENDERING OF A SCENE FROM A SINGLE IMAGE

CLAIM OF PRIORITY

This application claims the benefit of U.S. Provisional Application No. 62/768,591 titled "Inverse Rendering, Depth Sensing, and Estimation of 3D Layout and Objects from a Single Image," filed Nov. 16, 2018, the entire contents of which is incorporated herein by reference.

TECHNICAL FIELD

The present disclosure relates to training a neural network model to perform inverse rendering. More specifically, inverse rendering is performed using a single input image to generate reflectance and geometry properties for the single input image.

BACKGROUND

As one of the core problems in computer vision, inverse rendering aims to estimate physical attributes (e.g., geometry, reflectance, and illumination) of a scene from photographs, with wide applications in gaming, augmented reality, virtual reality, and robotics. As a long-standing, highly ill-posed problem, inverse rendering has been studied primarily for single objects or for estimating a single scene attributes. There is a need for addressing these issues and/or other issues associated with the prior art.

SUMMARY

Inverse rendering estimates physical scene attributes (e.g., reflectance, geometry, and lighting) from image(s) and is used for gaming, virtual reality, augmented reality, and robotics. An inverse rendering network (IRN) receives a single input image of a 3D scene and generates the physical scene attributes for the image. Specifically, the IRN estimates reflectance properties (albedo), geometry properties (surface normal vectors), and an illumination map (for global distant-direct lighting). Generally, the albedo characterizes materials in the image. In an embodiment, the IRN also predicts glossiness segmentation.

The IRN is trained by using the estimated physical scene attributes generated by the IRN to reproduce the input image and updating parameters of the IRN to reduce differences between the reproduced input image and the input image. A direct renderer and a residual appearance renderer (RAR) reproduce the input image. The RAR predicts a residual image representing complex appearance effects of the real (not synthetic) image based on features extracted from the image and the reflectance and geometry properties. The residual image represents near-field illumination, cast shadows, inter-reflections, and realistic shading that are not provided by the direct renderer.

A method, computer readable medium, and system are disclosed for training a neural network model to perform inverse rendering. Reflectance properties and geometry properties extracted from an image of a three-dimensional (3D) scene are provided to a first encoder neural network that computes intrinsic features based on the reflectance properties and geometry properties. The image is processed by a second encoder neural network to produce image features. A decoder neural network computes a residual image representing complex appearance effects of the image based on the image features and the intrinsic features.

DETAILED DESCRIPTION

A learning based approach that jointly estimates albedo, surface normal vectors (normals), and lighting of a 3D scene from a single image is described. Albedo is a measure of the amount of light that is reflected from a surface, so that higher values indicate a highly reflective surface and lower values indicate a surface that absorbs most of the light that hits it. A normal vector for a point on a surface is perpendicular to the surface. The lighting is global or environmental lighting (intensity and color represented by an illumination map) indicating levels of brightness present in a center area of the image.

Inverse rendering has two main challenges. First, it is inherently ill-posed, especially if only a single image is given. In an embodiment, the 3D scene is an indoor scene. Conventional solutions for inverse rendering a single image focus only on a single object in the 3D scene. Second, inverse rendering of an image of a 3D scene is particularly challenging, compared to inverse rendering an image including a single object, due to the complex appearance effects (e.g., inter-reflection, cast shadows, near-field illumination and realistic shading). In contrast with existing techniques that are limited to estimating only one of the scene attributes, the described technique estimates multiple scene attributes from a single image of a 3D scene.

A major challenge in solving the problem of inverse rendering is the lack of ground-truth labels for real (not synthetic) images that are used to train a neural network model to perform inverse rendering. Although ground-truth labels are available for geometry, collected by depth sensors, reflectance and lighting are extremely difficult to measure at the large scale that is needed for training a neural network. Ground-truth labeled training datasets for inverse rendering are available for synthetic images. However, neural network models trained on synthetic images often fail to generalize well on real images. In other words, a neural network model trained to perform inverse rendering for synthetic images typically does not perform well when used to perform inverse rendering for a different domain, namely real images.

Figure 1A:
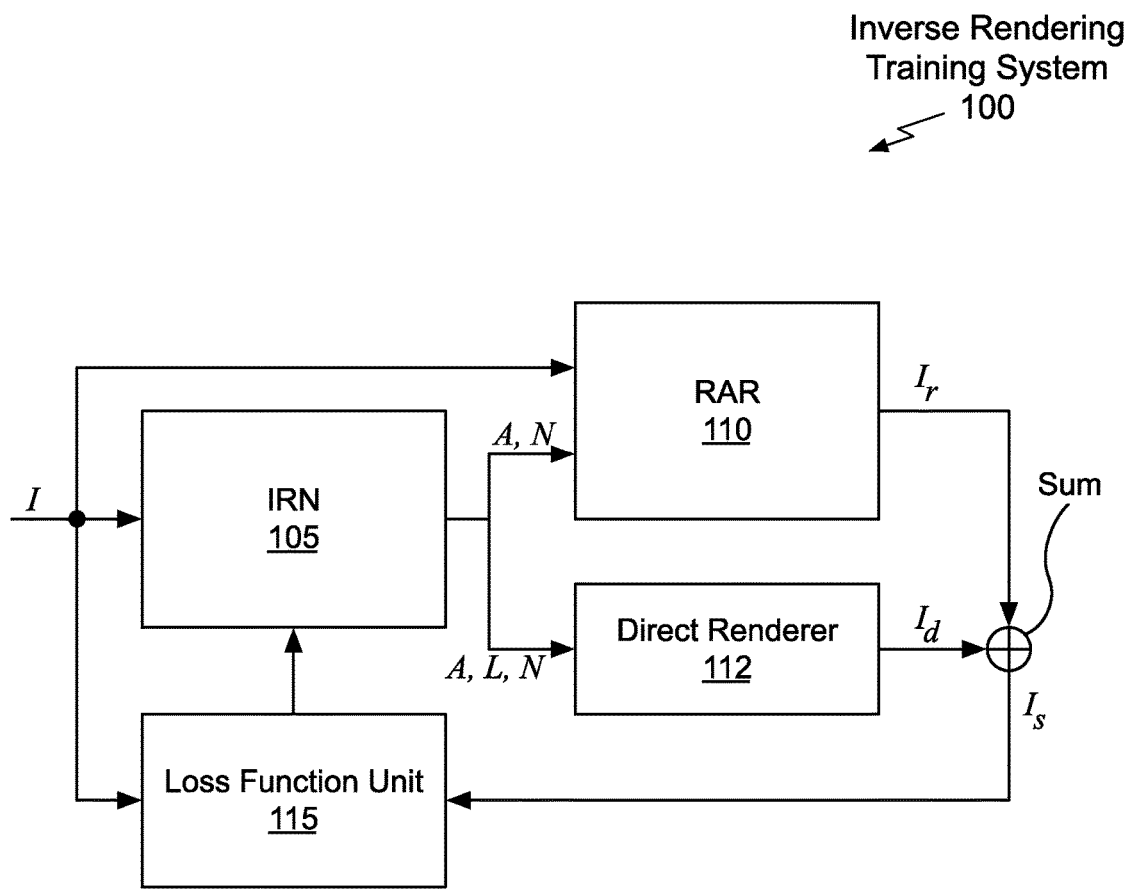
FIG. 1A illustrates a block diagram of an inverse rendering training system, in accordance with an embodiment.
Figure 1A:
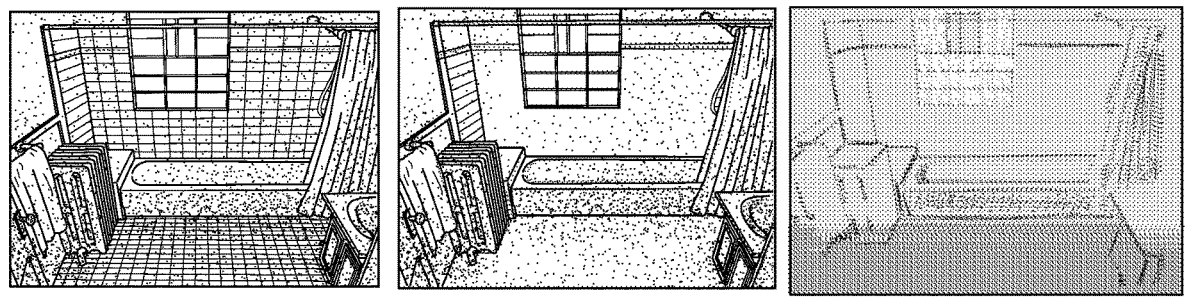

FIG. 1A illustrates a block diagram of an inverse rendering training system 100, in accordance with an embodiment. The inverse rendering training system 100 includes an inverse rendering network (IRN) 105, a residual appearance renderer (RAR) 110, a direct renderer 112, and a loss function unit 115. Although the inverse rendering training system 100 is described in the context of processing units, one or more of the IRN 105, the RAR 110, the direct renderer 112, and the loss function unit 115 may be implemented by a program, custom circuitry, or by a combination of custom circuitry and a program. For example, operations of the IRN 105 may be performed by a GPU (graphics processing unit), CPU (central processing unit), or any processor capable of extracting features.

To enable training of the IRN 105 to generalize from inverse rendering synthetic images to inverse rendering real images, the system includes the direct renderer 112 and the RAR 110. The IRN 105 receives an image (I) of a 3D scene and decomposes the image based on trainable parameters (e.g. weights), producing albedo (A), normals (N), and an illumination map (L). Albedo represents the reflectance properties and the normals represent the geometric properties of the 3D scene. In an embodiment, the albedo A, normals N, and illumination map L can be generated as a 2D array with a value or vector for each pixel of the input image I. In an embodiment, glossiness segmentation is also predicted by the IRN 105. The components may be used to reconstruct the input image I, producing a reconstructed image $I_s$. The loss function unit 115 compares the input image I to the reconstructed (resynthesized) image $I_s$ and updates the parameters used by the IRN 105 to decompose the image.

The direct renderer 112 is a shading function which synthesizes the direct illumination contribution of the reconstructed image from the components predicted by the IRN 105. Specifically, the direct renderer 112 receives the illumination map L, the reflectance properties A, and the geometry properties N and computes a rendered image Id that approximates the input image I. The direct renderer 112 is differentiable and does not require any trained parameters. In an embodiment, the direct renderer 112 is a closed-form shading function with no learnable (e.g., trained) parameters.

As shown in the images of FIG. 1A, the direct illumination portion of the reconstructed image synthesized by the direct renderer 112, Id, is missing the more complex appearance effects (e.g., inter-reflection, cast shadows, near-field illumination, and realistic shading) that are included in the input image I and the reconstructed image $I_s$. The RAR 110 synthesizes the more complex appearance effects. The RAR 110 receives the image I, the reflectance properties A, and the geometry properties N and computes a residual image $I_r$ that represents the complex appearance effects of the input image I. The rendered image is summed with the residual image to produce the reconstructed image $I_s$. In an embodiment, the loss function unit 115 computes a photometric reconstruction loss by comparing the input image and the reconstructed image.

The RAR 110 is a neural network model that, prior to being incorporated into the inverse rendering training system 100, has learned to synthesize the complex appearance effects for labeled synthetic images. In other words, in an embodiment, the RAR 110 is not trained within the inverse rendering training system 100. After being trained, the RAR 110 operates as a fixed-function differentiable function configured to produce a residual image given an image and the reflectance and geometry properties extracted from the image. The trained RAR 110 is then included in the inverse rendering training system 100 to train the IRN 105 in a self-supervised manner using unlabeled real images. In an embodiment, labeled synthetic images are used to pre-train the IRN 105 before the IRN 105 is trained within the inverse rendering training system 100, and then parameters of the IRN 105 are fine-tuned within the inverse rendering training system 100 using unlabeled real images.

The purpose of the RAR 110 is to enable self-supervised training of the IRN 105 on real images by capturing complex appearance effects that cannot be modeled by a direct renderer 112. The RAR 110, along with the direct renderer 112, reconstruct the image from the components estimated by the IRN 105. The reconstructed image can then be used to train the IRN 105 with a reconstruction loss computed by the loss function unit 115. Performance of the IRN 105 is improved compared with training only with synthetic images. Additionally, labeled real image training datasets are not necessary to train the IRN 105.

Conventional inverse rendering training systems do not include the RAR 110 and are therefore typically limited to inverse rendering images with direct illumination under distant lighting and a single material. For real images of a scene, however, the simple direct illumination renderer cannot synthesize important, complex appearance effects represented by the residual image, such as inter-reflections, cast shadows, near-field lighting, and realistic shading. The complex appearance effects provided by the RAR 110 may be simulated with a rendering equation via physically-based ray-tracing, which is non-differentiable. However, learning-based frameworks, such as the inverse rendering training system 100, require differentiable computations to perform back propagation of the losses to update parameters of the IRN 105. Therefore, a system that omits the RAR 110 and replaces, or includes, the direct renderer 112 with the rendering equation for physically-based ray-tracing cannot be used to train the IRN 105. In contrast, the RAR 110 is a neural network model that is differentiable.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
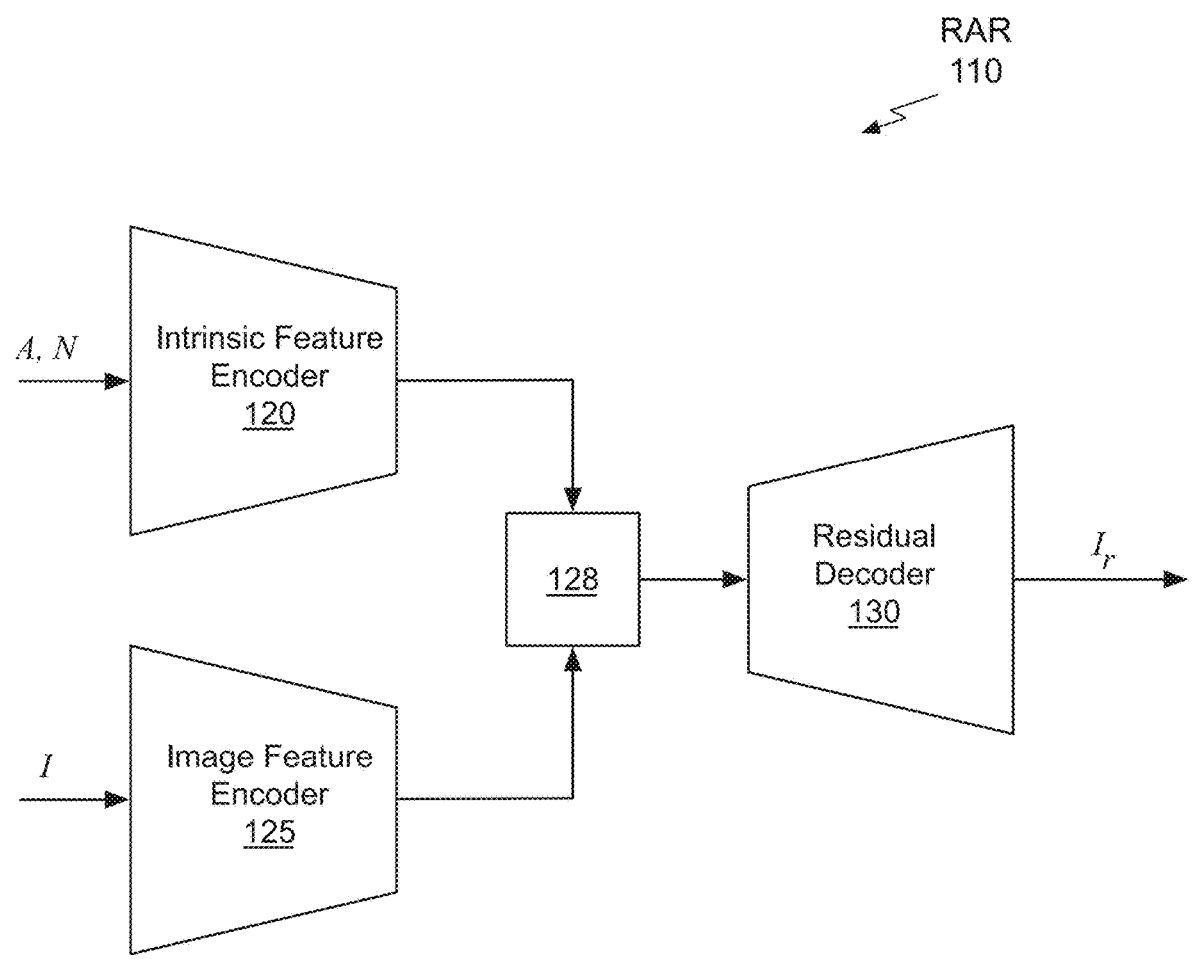
FIG. 1B illustrates a block diagram of the residual appearance renderer of FIG. 1A, in accordance with an embodiment.

FIG. 1B illustrates a block diagram of the RAR 110 of FIG. 1A, in accordance with an embodiment. Although the RAR 110 is described in the context of processing units, the RAR 110 may also be implemented by a program, custom circuitry, or by a combination of custom circuitry and a program. The RAR 110 includes an intrinsic feature encoder 120, an image features encoder 125, and a residual decoder 130. In an embodiment, the combined intrinsic feature encoder 120 and residual decoder 130 is implemented as a U-Net structure. The intrinsic feature encoder 120 receives the normals and albedo and extracts latent image features. In an embodiment, the intrinsic feature encoder 120 is a convolutional encoder. The image feature encoder 120 receives the image and extracts image features from the input image that are combined with the latent image features by block 128 before being processed by the residual decoder 130.

In principle, a combination of the RAR 110 and the direct renderer 112 may be considered to be an auto-encoder. In an embodiment, the RAR 110 learns to encode complex appearance features from the image into a latent subspace (D=300 dimension). The bottleneck of the auto-encoder architecture present in the RAR 110 forces the RAR 110 to focus only on the complex appearance features rather than on the entire image. Therefore, the RAR 110 learns to encode the non-directly rendered part of the image to avoid paying a penalty in the reconstruction loss. In an embodiment, the RAR 110 is simpler compared with a differentiable renderer.

In an embodiment, the intrinsic feature encoder 120 is implemented as: C64(k3)-C*64(k3)-C*128(k3)-C*256(k3)-C*512(k3), the residual decoder 130 is implemented as: CU512(k3)-CU256(k3)-CU128(k3)-CU64(k3)-Co3(k1), where 'CN(kS)' denotes convolution layers with N S×S filters with stride 1, following by Batch Normalization and ReLU (Rectified Linear Unit). 'C*N(kS)' denotes convolution layers with N S×S filters with stride 2, followed by Batch Normalization and ReLU. 'CUN(kS)' represents a bilinear up-sampling layer, followed by convolution layers with N S×S filters with stride 1, followed by Batch Normalization and ReLU. 'Co3(k1)' consists of 3 1×1 convolution filters to produce Normal or Albedo. Skip-connections exist between 'C*N(k3)' layers of the intrinsic feature encoder 120 and 'CUN(k3)' layers of the residual decoder 130. The image feature encoder 125 encodes the image features to a latent D=300 dimensional subspace is given by: 'C64(k7)-C*128(k3)-C*256(k3)-C128(k1)-C64(k3)-C*32(k3)-C16(k3)-MLP(300). 'CN(kS)' denotes convolution layers with N S×S filters with stride 1, followed by Batch Normalization and ReLU. 'C*N(kS)' denotes convolution layers with N S×S filters with stride 2, followed by Batch Normalization and ReLU. MLP(300) takes the response of the previous layers and outputs a 300 dimensional feature, which is concatenated with the last layer of the intrinsic feature encoder 120 by the block 128.

Figure 1C:
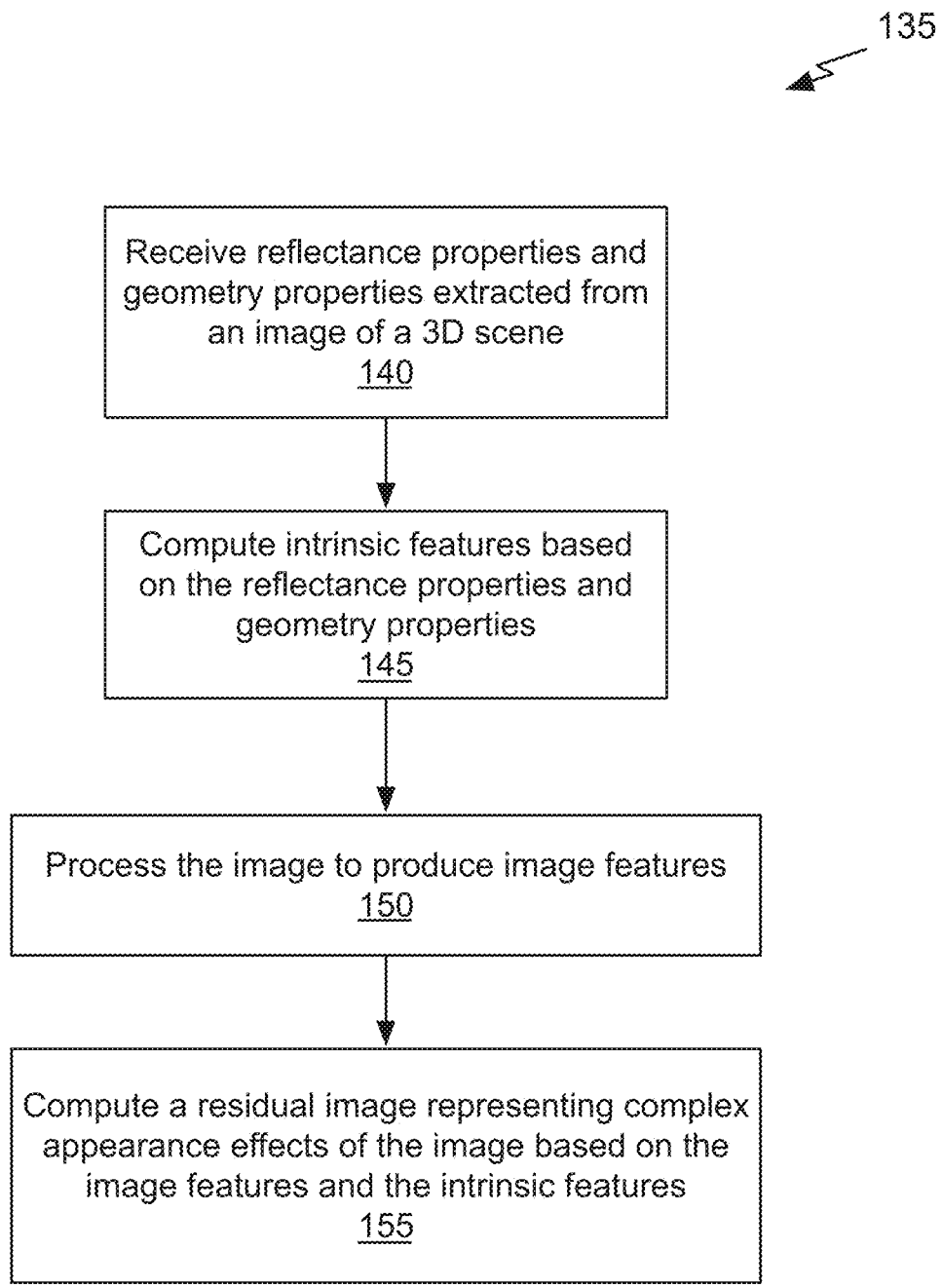
FIG. 1C illustrates a flowchart of a method for computing a residual image, in accordance with an embodiment.

FIG. 1C illustrates a flowchart of a method 135 for computing a residual image, in accordance with an embodiment. Although method 135 is described in the context of the RAR 110 and the inverse rendering training system 100, persons of ordinary skill in the art will understand that any system that performs method 135 is within the scope and spirit of embodiments of the present disclosure.

At step 140, reflectance properties and geometry properties (e.g., intrinsics) extracted from an image of a 3D scene are received. In an embodiment, only a single image of the 3D scene is received. In an embodiment, the 3D scene is an indoor scene. In an embodiment, the reflectance properties are albedo and the geometry properties are normal vectors.

In an embodiment, the reflectance properties and the geometry properties are extracted from the image by the IRN 105 or another inverse renderer and are received by the RAR 110. In an embodiment, the 3D scene is a real scene captured by an image sensor and the image is not an image of a synthetic scene rendered by a processor or processors.

At step 145, intrinsic features are computed based on the reflectance properties and the geometry properties. In an embodiment, the intrinsic features are extracted by the intrinsic feature encoder 120. At step 150, the image is processed to produce image features. In an embodiment, the intrinsic features are extracted by the image feature encoder 125. At step 155, a residual image representing complex appearance effects of the image is computed based on the image features and the intrinsic features. In an embodiment, the residual image is computed by the residual decoder 130. In an embodiment, the residual image represents regions of the image where one or more of the following complex appearance effects are present: inter-reflection, cast shadows, near-field illumination, and realistic shading.

In an embodiment, the reflectance properties and the geometry properties, as well as an illumination map corresponding to the image, are processed by the direct renderer 112 to generate a rendered image corresponding to the image. In an embodiment, the rendered image is combined with the residual image to produce a reconstructed image corresponding to the image. The reconstructed image approximates the image. In an embodiment, values for corresponding pixels in the reconstructed image are compared, by the loss function unit 115, with the image to compute a loss value. In an embodiment, parameters used by the IRN 105 to generate the reflectance properties and the geometry properties are adjusted based on the loss value.

Figure 1D:
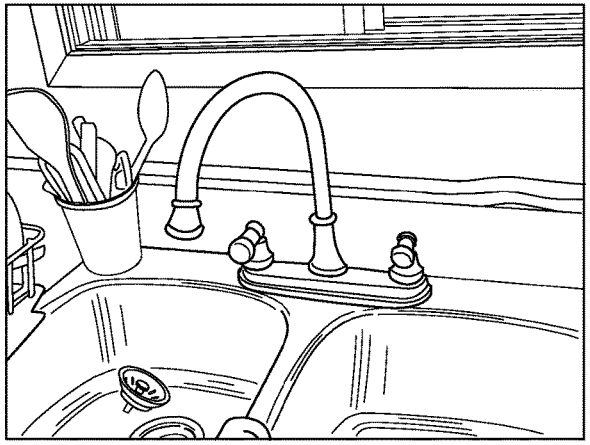
FIG. 1D illustrates an image, corresponding extracted properties, and a reconstructed image, in accordance with an embodiment.
Figure 1D:
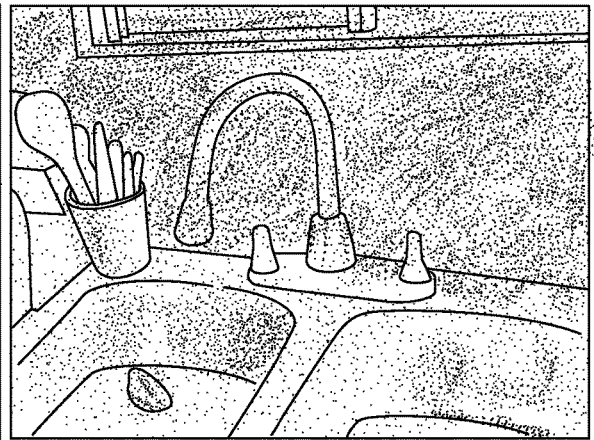
Figure 1D:
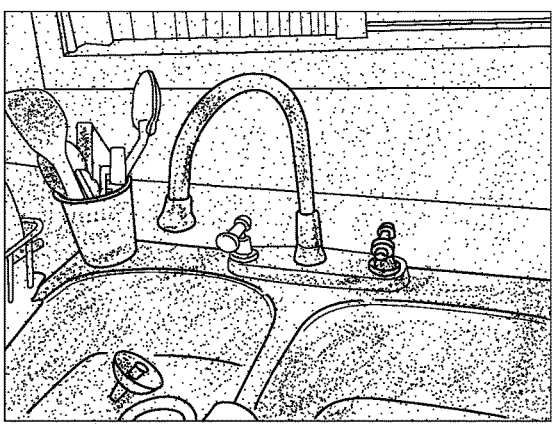
Figure 1D:
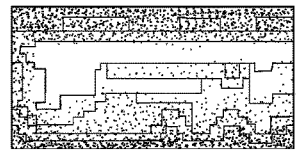
Figure 1D:
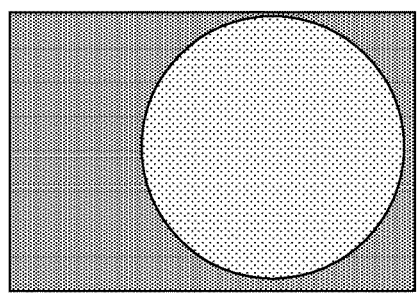
Figure 1D:
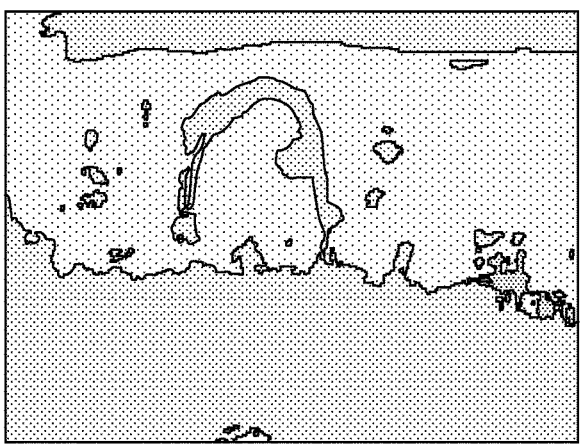
Figure 1D:
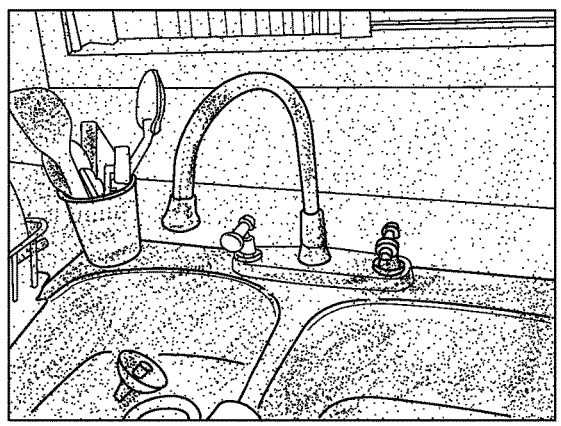

FIG. 1D illustrates an image, corresponding extracted properties, and a reconstructed image, in accordance with an embodiment. As shown in FIG. 1D, the extracted properties include the albedo, the normal, the lighting, and glossiness. For augmented reality (AR) and re-lighting applications, the illumination should be separated from the geometry. Therefore, the lighting is needed in addition to the normals. In an embodiment, the lighting is an illumination or environment map.

The glossiness, G, indicates highly reflective surfaces associated with specular highlights, such as the faucet, sink, and window. In an embodiment, the glossiness may be estimated by the IRN 105 and used by the RAR 110 to produce more accurate complex appearance effects. Glossiness also indicates areas that are very diffuse and not reflective, such as carpet or fabric upholstery. In an embodiment, glossiness is a segmentation map identifying pixels associated with different categories (i.e., matte, semi-glossy, and glossy).

Given an input image I, the IRN 105, denoted as $h_d(I;\Theta_d)$, estimates surface normal N, albedo A, and lighting L:

$$h_d(I;\Theta_d) \rightarrow \{\hat{A}, \hat{N}, \hat{L}\} \qquad (1)$$

The IRN 105 may be trained with supervised learning using labeled synthetic data. The ground truth lighting is challenging to obtain, as it is the approximation of the actual surface light field. Environment maps may be used as the exterior lighting for rendering synthetic images of indoor scenes, but the environment maps cannot be directly set as L*, when the virtual cameras are placed inside each of the indoor scenes. Due to occlusions, only a small fraction of the exterior lighting (e.g., through windows and open doors) is directly visible. The surface light field of each scene is mainly due to global illumination (i.e., inter-reflection) and some interior lighting. L* can be approximated by minimizing the difference between a ray-traced synthetic image I and the output Id of the direct renderer 112, denoted by $f_d(\bullet)$, with ground truth albedo A* and normals N*. However, the approximation was found to be inaccurate, since $f_d(\bullet)$ cannot model the residual appearance present in the ray-traced image I.

Therefore, in an embodiment, a learning-based method is used to approximate the ground truth lighting L* Specifically, a residual block-based network, $h_e(\bullet;\Theta_e)$, is trained to predict L* from the input image I, normals N*, and albedo A*. In an embodiment, the "ground truth" lighting, $\hat{L}^*$ is approximated by the separate neural network $h_e(\bullet;\Theta_e) \to \{\hat{L}^*\}$.

In an embodiment, $h_e(\bullet;\Theta'_e)$ is first trained with the images synthesized by $f_d(\bullet)$ with ground truth normals, albedo, and indoor lighting, $I_d = f_d(A^*,N^*,L)$, where L is randomly sampled from a set of real indoor environment maps. The separate neural network learns apriori over the distribution of indoor lighting; i.e., $h(I_d;\Theta'_e) \to L$. Next, the separate neural network $h_e(\bullet;\Theta'_e)$ is fine-tuned on the ray-traced images I, by minimizing the reconstruction loss: $\|I-f_d(A^*,N^*,\hat{L}^*)\|$. In this manner, the approximated ground truth of the environmental lighting $\hat{L}^*=h_e(I;\Theta_e)$ is obtained which can best reconstruct the ray-traced image I modelled by $f_d(\bullet)$. The IRN 105 can then be trained using the ground truth training dataset including synthetic images.

To generalize from synthetic to real images, the self-supervised reconstruction loss is used to train the pre-trained IRN 105 using real images. Specifically, as shown in FIG. 1A, during self-supervised training, the direct renderer 112 and the RAR 110 are used to re-synthesize the input image from the estimations provided by the IRN 105.

The direct renderer 112, denoted by $f_d(\bullet)$ is a simple closed-form shading function with no learnable parameters, which synthesizes the direct illumination part $\hat{I}_d$ of the image. The RAR 110, denoted by $f_r(\bullet;\Theta_r)$, is a trainable neural network model, which learns to synthesize the complex appearance effects $\hat{I}_r$:

Direct Renderer: $f_d\{\hat{A},\hat{N},\hat{L}\} \to \hat{I}_d$ (2)

RAR: $f_r\{I,\hat{A},\hat{N},\Theta_r\} \to \hat{I}_r$. (3)

The self-supervised reconstruction loss computed by the loss function unit 115 may be defined as $\|I-(\hat{I}_d+\hat{I}_r)\|_1$. When glossiness is estimated by the IRN 105, the glossiness segmentation S is:

IRN-Specular: $h_s\{I,\Theta_s\} \to \hat{S}$, (4)

where $\Theta_s$ is a set of parameters (e.g., weights) used by the IRN 105 to estimate S and is learned during training.

Figure 2A:
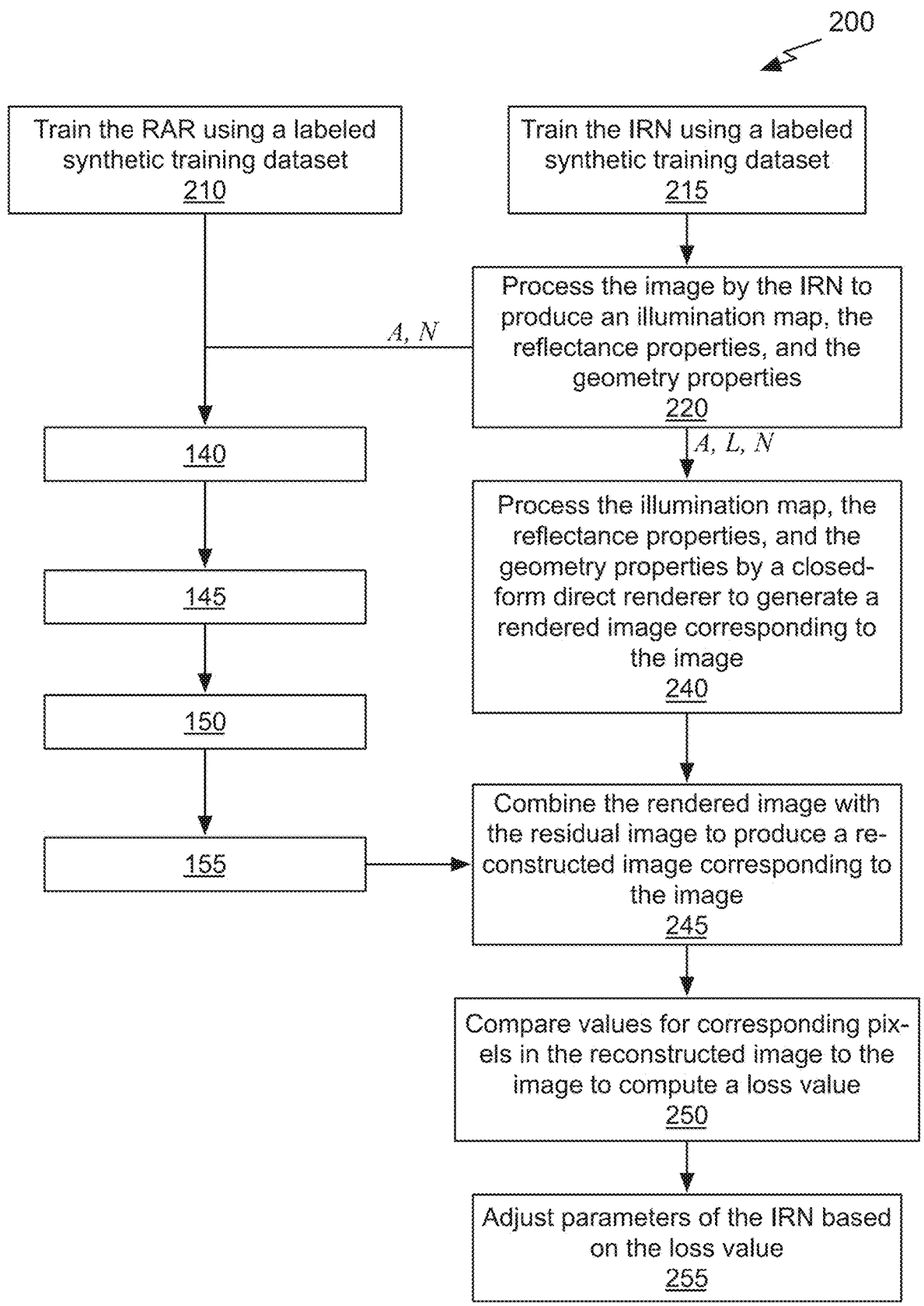
FIG. 2A illustrates a flowchart of a method for training an inverse rendering system, in accordance with an embodiment.

FIG. 2A illustrates a flowchart of a method 200 for training an inverse rendering system, in accordance with an embodiment. Although method 200 is described in the context of the inverse rendering training system 100, persons of ordinary skill in the art will understand that any system that performs method 200 is within the scope and spirit of embodiments of the present disclosure.

At step 210, the RAR 110 is trained via supervised learning using a labeled synthetic training dataset. In an embodiment, the RAR 110 is trained using an L1 image reconstruction loss. At step 215, the IRN 105 is trained via supervised learning using a labeled synthetic training dataset. The labeled synthetic training dataset for the IRN 105 includes at least ground truth albedos and normals. Ground truth lighting (e.g., indoor environment map) may be approximated for the labeled synthetic training dataset using the separate neural network. In an embodiment, the supervised loss computed during supervised training of the IRN 105 is $$L_s = \lambda_1\|\hat{N}-N^*\|_1 + \lambda_2\|\hat{A}-A^*\|_1 + \lambda_3\|f_d(A^*,N^*,\hat{L}) - f_d(A^*,N^*,\hat{L}^*)\|_1, \quad (4)$$

where $\lambda_1=1$, $\lambda_2=1$, and $\lambda_3=0.5$.

Learning from synthetic data alone is not sufficient for the IRN 105 to perform well on real images. Obtaining ground truth labels for inverse rendering is almost impossible for real images (especially for reflectance and illumination). Therefore, the IRN 105 may be trained using self-supervised reconstruction loss and weak supervision from sparse labels. The sparse labels for real images, when available, may be associated with either the reflectance properties or the geometry properties. At step 220, the image is processed by the IRN 105 to produce an illumination map, the reflectance properties, and the geometry properties (e.g., A, L, and N).

Previous works on faces and objects have shown success in using a self-supervised reconstruction loss for learning from unlabeled real images. Typically, scenes including a face or single object do not require estimations of complex appearance effects resulting from localized lighting and/or a variety of materials. As previously described, the reconstruction for faces and single objects is typically limited to the direct renderer $f_d(\bullet)$, which is a simple closed-form shading function (under distant lighting) with no learnable parameters.

At step 240, the illumination map, the reflectance properties, and the geometry properties are processed by the closed-form direct renderer 112 to produce a rendered image corresponding to the image. In an embodiment, the direct renderer 112, $f_d(\bullet)$ may be implemented as:

$$\hat{I}_d = f_d(\hat{A},\hat{N},\hat{L}) = \hat{A}\Sigma_i \max(0,\hat{N}\cdot\hat{L}_i), \quad (5)$$

where $\hat{L}_i$ corresponds to the pixels on the environment map $\hat{L}_i$.

While using $f_d(\bullet)$ to compute the reconstruction loss may work well for images of faces or single objects with homogeneous material, using $f_d(\bullet)$ fails for inverse rendering of an image of a 3D scene, particularly an indoor scene or a scene with multiple objects and complex appearance effects. Therefore, the RAR 110 is included in the inverse rendering training system 100 to estimate the residual image representing the complex appearance effects. Steps 140, 145, 150, and 155 are performed by the RAR 110 as previously described in conjunction with FIG. 1C to compute a residual image representing complex appearance effects of the image.

At step 245, the rendered image is combined with the residual image to produce a reconstructed image corresponding to the image. At step 250, the loss function unit 115 compares values for corresponding pixels in the reconstructed image to the image to compute a loss value. At step 255, parameters of the IRN 105 are adjusted based on the loss value.

Figure 2B:
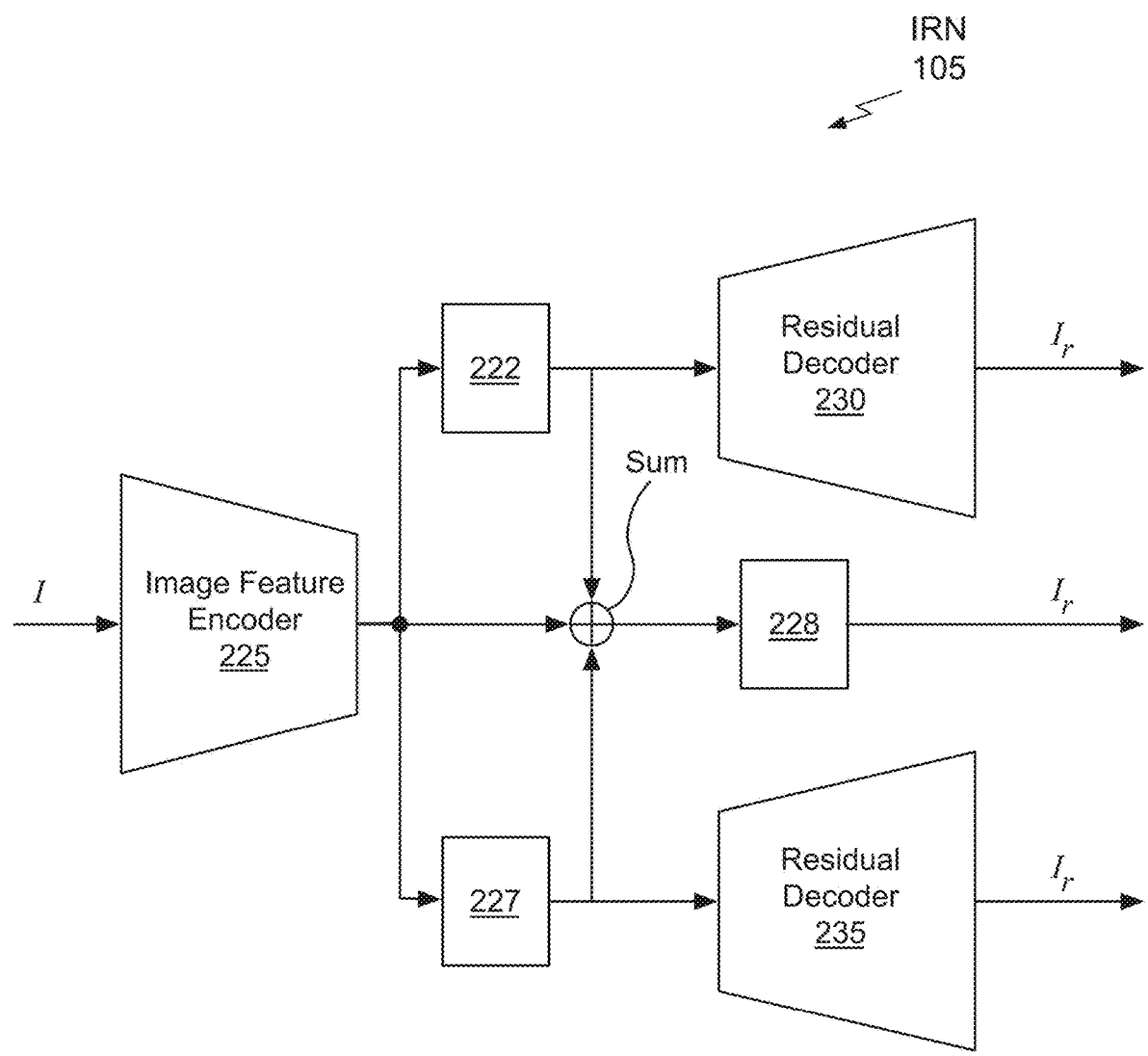
FIG. 2B illustrates a block diagram of the inverse rendering network of FIG. 1A, in accordance with an embodiment.

FIG. 2B illustrates a block diagram of the IRN 105 of FIG. 1A, in accordance with an embodiment. Although the IRN 105 is described in the context of processing units, the IRN 105 may also be implemented by a program, custom circuitry, or by a combination of custom circuitry and a program. The IRN 105 includes an image feature encoder 225, a residual decoder 230, and a residual decoder 235. In an embodiment the image feature encoder 225 is a convolutional encoder. In an embodiment, the residual decoders 230 and 235 are convolutional decoders.

In an embodiment, the input to the IRN 105 is an image of spatial resolution 240×320, and the output is an albedo and normal map of the same spatial resolution along with an 18×36 resolution environment map. In an embodiment, image feature encoder 225 architecture is: C64(k7)-C*128(k3)-C*256(k3), where 'CN'(kS)' denotes convolution layers with N S×S filters with stride 1, followed by Batch Normalization and ReLU. 'C*N(kS)' denotes convolution layers with N S×S filters with stride 2, followed by Batch Normalization and ReLU. The output of the image feature encoder 225 is a blob (e.g., feature map) of spatial resolution 256×60×80.

In an embodiment, blocks 222 and 227 each include 9 Residual Blocks, 'ResBLKs, which operate at a spatial resolution of 256×60×80. Each 'ResBLK' consists of Conv256(k3)-BN-ReLU-Conv256(k3)-BN, where 'ConvN(kS)' and 'BN' denote convolution layers with N S×S filters of stride 1 and Batch Normalization. Note that the weights used by blocks 222 and 227 are not shared because the block 222 is trained to estimate normals and the block 227 is trained to estimate albedo.

In an embodiment, the residual decoder 230 estimates the normals using the following architecture: CD*128(k3)-CD*64(k3)-Co3(k7), where 'CD*N(kS)' denotes Transposed Convolution layers with N S×S filters with stride 2, followed by Batch Normalization and ReLU, and 'CN(kS)' denotes convolution layers with N S×S filters with stride 1, followed by Batch Normalization and ReLU. The last layer Co3k(7) consists of only convolution layers of 2 7×7 filters, followed by a Tanh layer. In an embodiment, the residual decoder 235 estimates the albedo using the same architecture as the residual decoder 230 with separate weights.

The outputs of the image feature encoder 225, the block 222, and the block 227 are concatenated by a sum operation to produce a blob of spatial resolution 768×60×80 that is input to block 228. In an embodiment, the block 228 estimates the illumination (environment) map using the following architecture: C256(k1)-C*256(k3)-C*128(k3)-C*3(k3)-BU(18,36), where 'CN(kS)' denotes convolution layers with N S×S filters with stride 1, followed by Batch Nomalization and ReLU, 'C*N(kS)' denotes convolution layers with N S×S filters with stride 2, followed by Batch Normalization and ReLU, and BU(18,36) up-samples the response to produce a 18×36×3 resolution environment map.

Intrinsic image decomposition is a sub-problem of inverse rendering, where a single image is decomposed into albedo and shading. In contrast with the inverse rendering performed by the IRN 105, conventional intrinsic image decomposition methods do not explicitly recover geometry or illumination but rather combine them together as shading. Applications such as AR and virtual reality (VR) require geometry data, and the shading data that is produced by intrinsic image decomposition does not provide the geometric information needed by the AR and VR applications. The separate normals and albedo data estimated by the IRN 105 are suitable for a wide range of applications in AR/VR. Example applications include image editing, such as inserting an object into scene and using the estimates of intrinsic attributes for navigation (vehicles) or grasping (robotics) to improve accuracy.

Figure 2C:
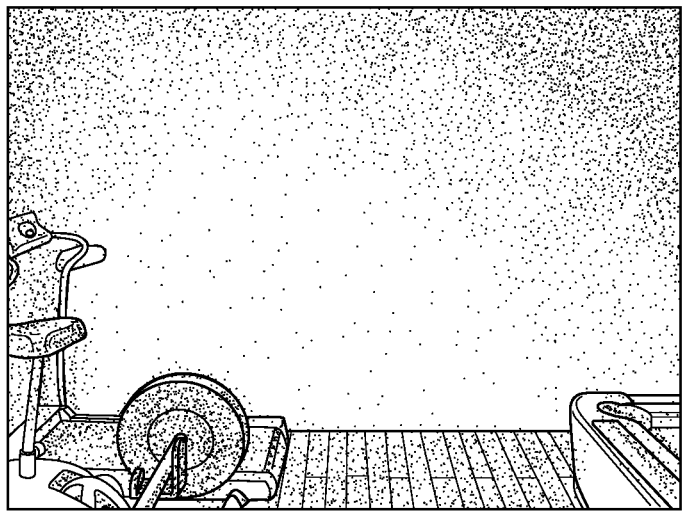
FIG. 2C illustrates an image, reconstructed direct rendered image, and the combination of the reconstructed direct rendered image and the residual image, in accordance with an embodiment.
Figure 2C:
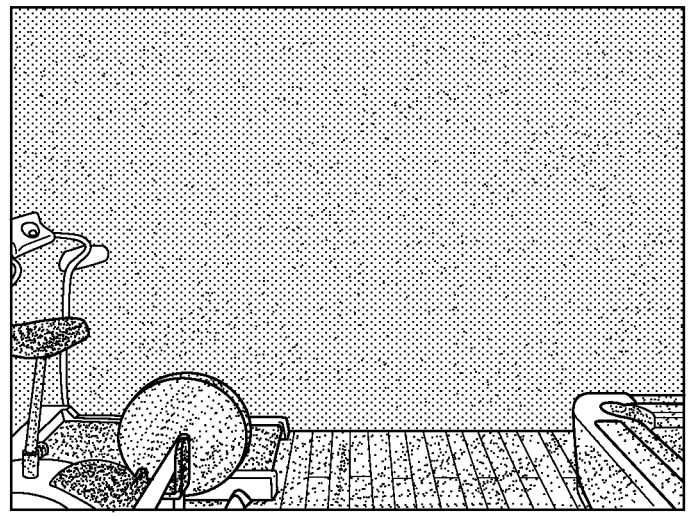
Figure 2C:
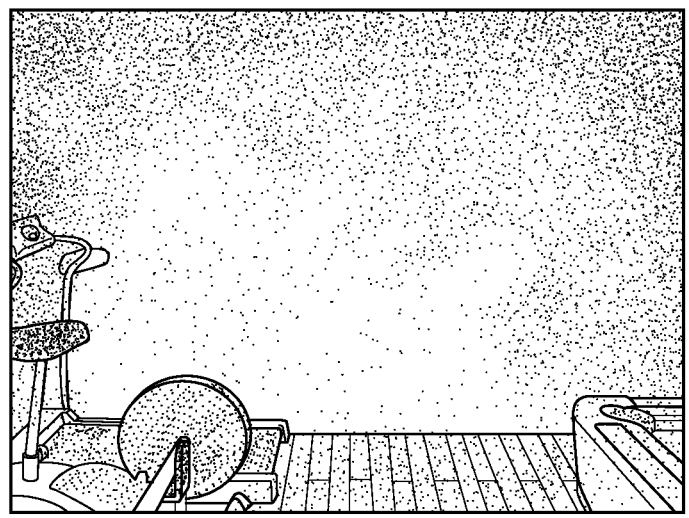

FIG. 2C illustrates an image I, reconstructed direct rendered image $I_d$, and the combination of the reconstructed direct rendered image and the residual image $I_d+I_r=I_s$, in accordance with an embodiment. The reconstructed direct rendered image does not include the complex appearance effect of the localized lighting. The complex visual effect of the localized lighting producing brightness in the center area of the image $I_s$ is provided by the residual image $I_r$.

Figure 2D:
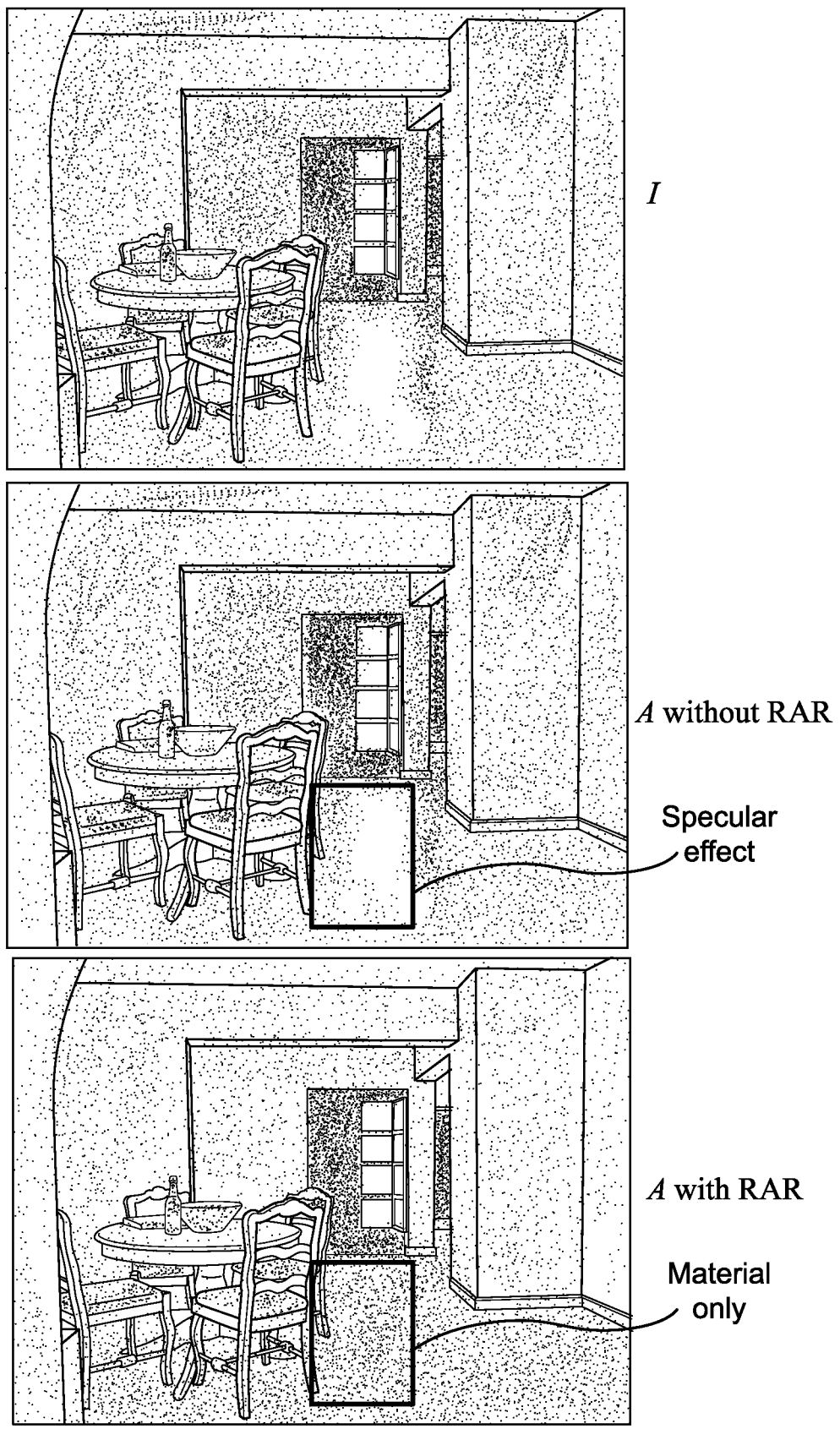
FIG. 2D illustrates an image I, A estimated by the IRN trained without the RAR, and A estimated by the IRN trained with the RAR, in accordance with an embodiment.

FIG. 2D illustrates an image I, A estimated by the IRN 105 trained without the RAR 110, and A estimated by the IRN 105 trained with the RAR 110, in accordance with an embodiment. For the intrinsic attribute of albedo, A to be accurate, which is necessary for using the albedo for image editing, navigation, and grasping applications, A should represent the material content of the scene and should not include complex appearance effects, such as specular highlights and shadows. As previously described, the goal of the RAR 110 is to provide the complex appearance effects.

As shown in FIG. 2D, a specular highlight from exterior light appears on the floor in the image I. When the IRN 105 is trained without the RAR 110, the IRN 105 learns to include specular highlights in the albedo because the direct renderer 112 cannot produce the specular highlights and the loss computation unit 115 adjusts the parameters of the IRN 105 to reduce differences between I and $I_d$. Therefore, when $I_d$ is missing the specular highlights, the parameters of the IRN 105 are adjusted to insert the specular highlights. In contrast, when the IRN 105 is trained with the RAR 110, the specular highlights are not included in the albedo because the RAR 110 produces the specular highlights in $I_r$ and the loss computation unit 115 does not adjust the parameters of the IRN 105 to cause to the IRN 105 to include the specular highlights in the albedo.

To ensure that the RAR 110 is trained to capture only the residual appearances and not to correct the artifacts of the direct rendered image due to faulty normals, albedo, and/or lighting estimation of the IRN 105, the RAR 110 is fixed when used in the inverse rendering training system 100 to train the IRN 105. In an embodiment, the RAR 110 is trained on only synthetic data with ground-truth normals and albedo, before being used in the inverse rendering training system 100, so that the RAR 110 learns to correctly predict the residual appearances when the direct renderer reconstruction is accurate. Training the RAR 110 separately enables the RAR 110 to learn to accurately estimate the complex appearance effects (e.g., inter-reflection, cast shadows, near-field illumination, and realistic shading) based on I, A, and N.

Figure 2E:
FIG. 2E illustrates an image annotated by humans for weak supervision, in accordance with an embodiment.
Figure 2E:
Figure 2E:
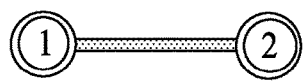

In addition to training the IRN 105 in a self-supervised manner using real images, the IRN 105 may by trained in a pseudo-supervised manner. In an embodiment, sparse relative reflectance judgement from humans is used as a weak form of supervision to disambiguate reflectance from shading. FIG. 2E illustrates an image annotated by humans for weak supervision, in accordance with an embodiment. The image annotated with pair-wise judgements 260 may be used for pseudo-supervised training of the IRN 105. In an embodiment, pair-wise relative reflectance judgments may be used as a form of supervision over albedo. Using such weak supervision can substantially improve performance on real images.

For any two points $R_1$ and $R_2$ on an image, a weighted confidence score classifies $R_1$ to be same, brighter, or darker than $R_2$. The labels are used to construct a hinge loss for sparse supervision. Specifically, $R_1$ is predicted to be darker than $R_2$ with confidence $w_t$, a loss function $w_t$ max(1+δ−$R_2/R_1$,0) is used. If $R_1$ and $R_2$ are predicted to have similar reflectance, a loss function $w_t$[max($R_2/R_1$−1−δ,0)+max($R_2/R_1$−1−δ,0)] is used.

The IRN 105 may be trained on real data with the following losses: (i) Psuedo-supervision loss over albedo ($L_a$), normal ($L_n$) and lighting ($L_e$), (ii) Photometric reconstruction loss with the RAR 110 ($L_u$), and (iii) Pair-wise weak supervision ($L_w$). The net loss function is defined as:

$$L = 0.5*L_a + 0.5*L_n + 0.1*L_e + L_u + 30*L_w \quad (6)$$

The IRN 105 may also be trained using a dataset with weak supervision over normals using the following losses:

(i) Psuedo-supervision loss over albedo ($L_a$) and lighting ($L_e$), (ii) Photometric reconstruction loss with the RAR 110 ($L_u$), and (iii) Supervision ($L_w$) over normals. The net loss function is then defined as:

$$L = 0.2*L_a + 0.05*L_e + L_u + 20*L_w \qquad (7)$$

The disclosed technique for training the IRN 105 for inverse rendering generalizes across different datasets. The IRN 105 and RAR 110 may be trained with synthetic data for a different domain and then the IRN 105 may be trained via self-supervision on real data in the different domain. For example, the IRN 105 may be trained to inverse render images of a scene within an office building and then trained to inverse render images of a scene within a cabin.

Generalization results from jointly reasoning about all components of the scene. Jointly predicting the intrinsic attributes by combining supervised training on synthetic data and self-supervised training on real data using the RAR 110 improves the albedo and normal estimates across different datasets.

The predicted normals are significantly improved when the RAR 110 is used to train the IRN 105. As for the albedo, using relative reflectance judgments without the RAR 110 produces very low contrast albedo. Conversely, training the IRN 105 with only the RAR 110, without any weak supervision, often fails to produce consistent albedo across large objects like walls, floor, ceilings, etc. Thus, the predicted albedos are improved when the RAR 110 is used to train the IRN 105 and the predicted albedos are further improved when relative reflectance judgements are used during the training.

Furthermore, training without RAR 110 and weak supervision produces poor albedo estimations which contain the complex appearance effects like cast shadows, inter-reflections, highlights, etc., as the reconstruction loss with direct renderer 112 alone cannot model the complex appearance effects. When the albedo is polluted with the complex appearance effects, the albedo is not suitable for use in image editing, guidance, and grasping applications.

The RAR 110 can synthesize complex appearance effects such as inter-reflection, cast shadows, near-field illumination, and realistic shading. In the absence of the RAR 110, the reconstruction loss used for self-supervised training cannot capture complex appearance effects, and the estimates of scene attributes are less accurate. The RAR 110 is important for employing the self-supervised reconstruction loss to learn inverse rendering on real images.

The inverse rendering training system 100 performs inverse rendering for an entire 3D scene rather than single objects in an image. The training technique offers several key benefits: increases the application scenarios for AR and image-based graphics, improves the quality and realism in the estimation of the intrinsics, and effectively removes artifacts from the estimations.

Parallel Processing Architecture

Figure 3:
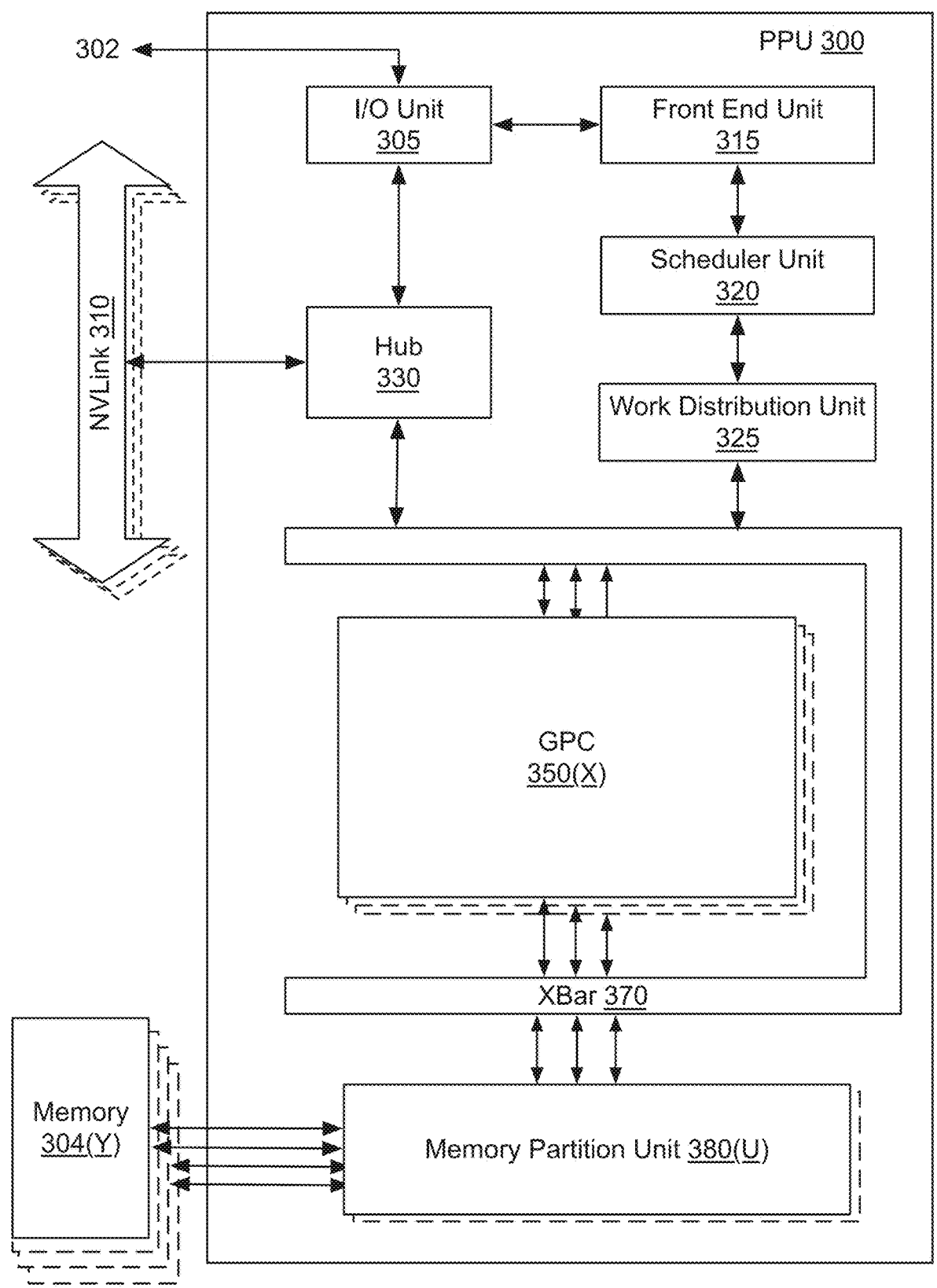
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
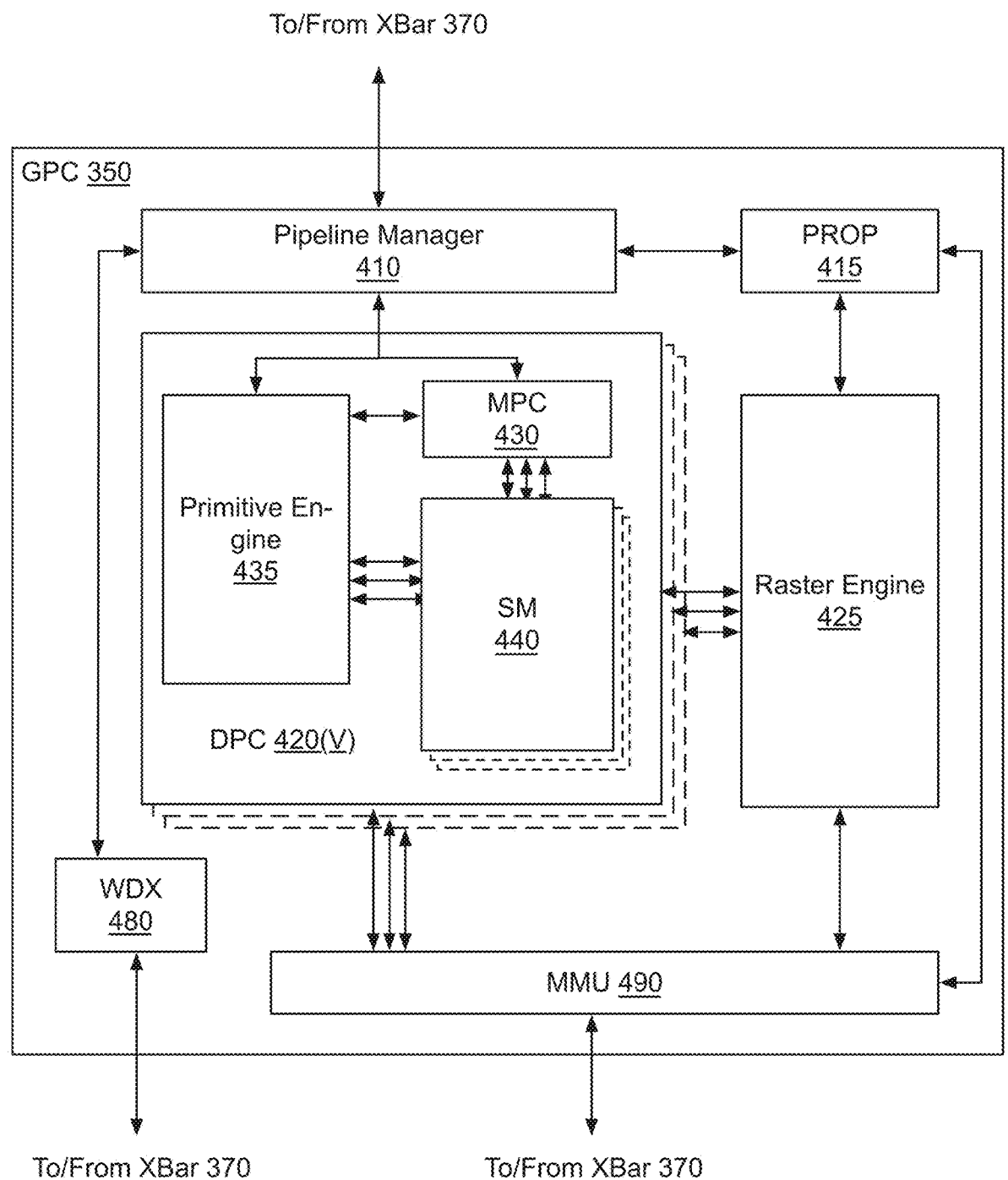
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
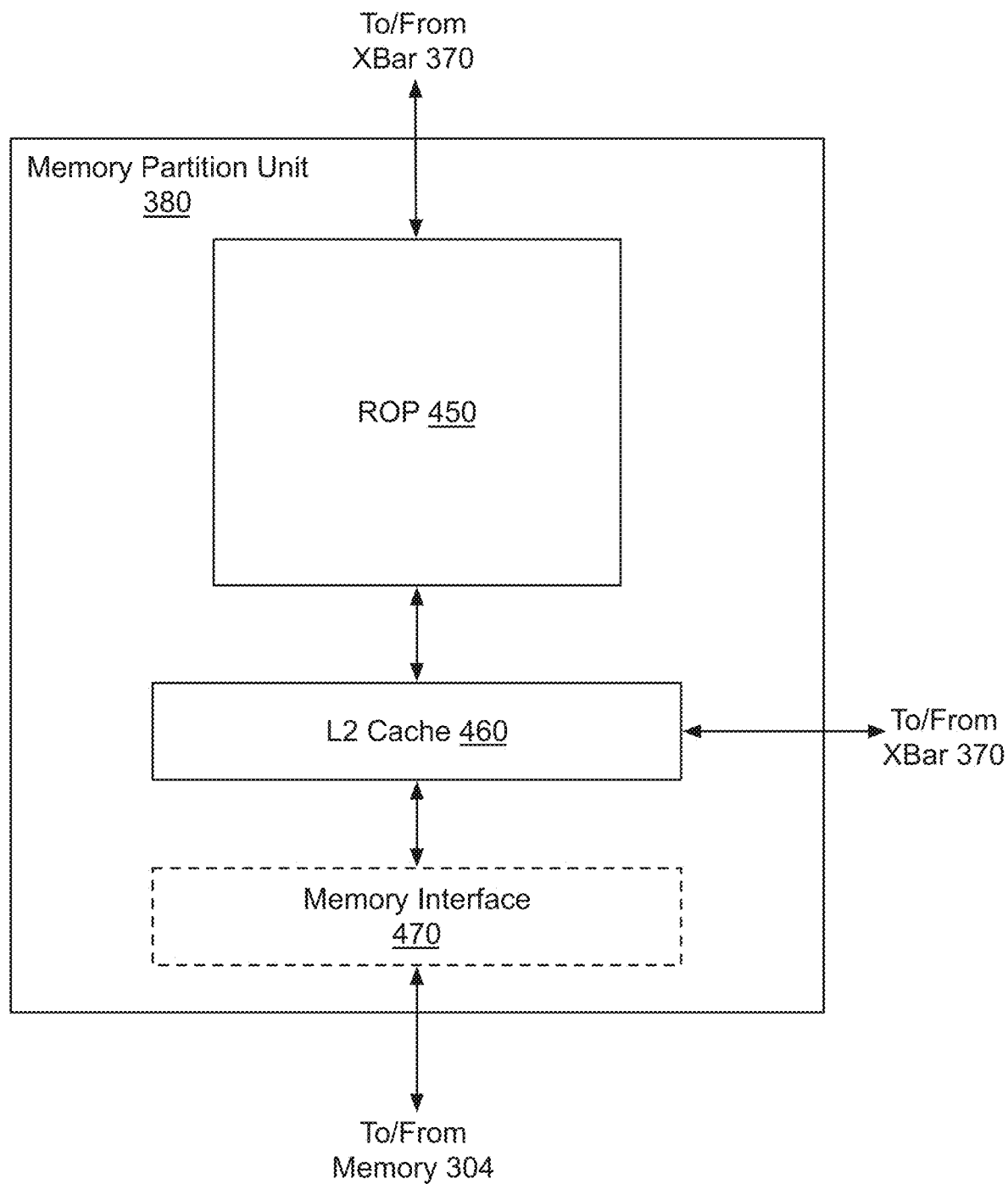
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
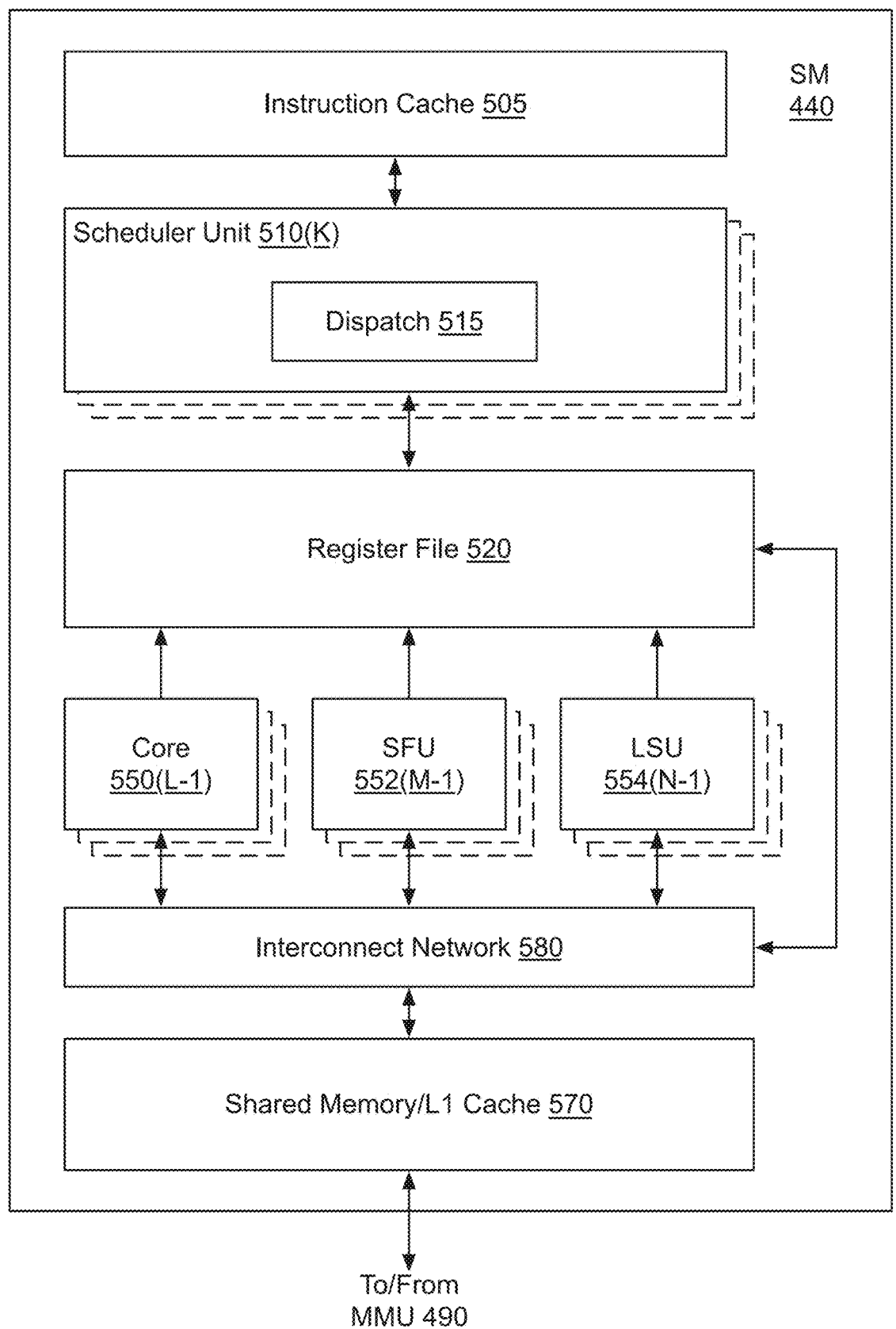
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
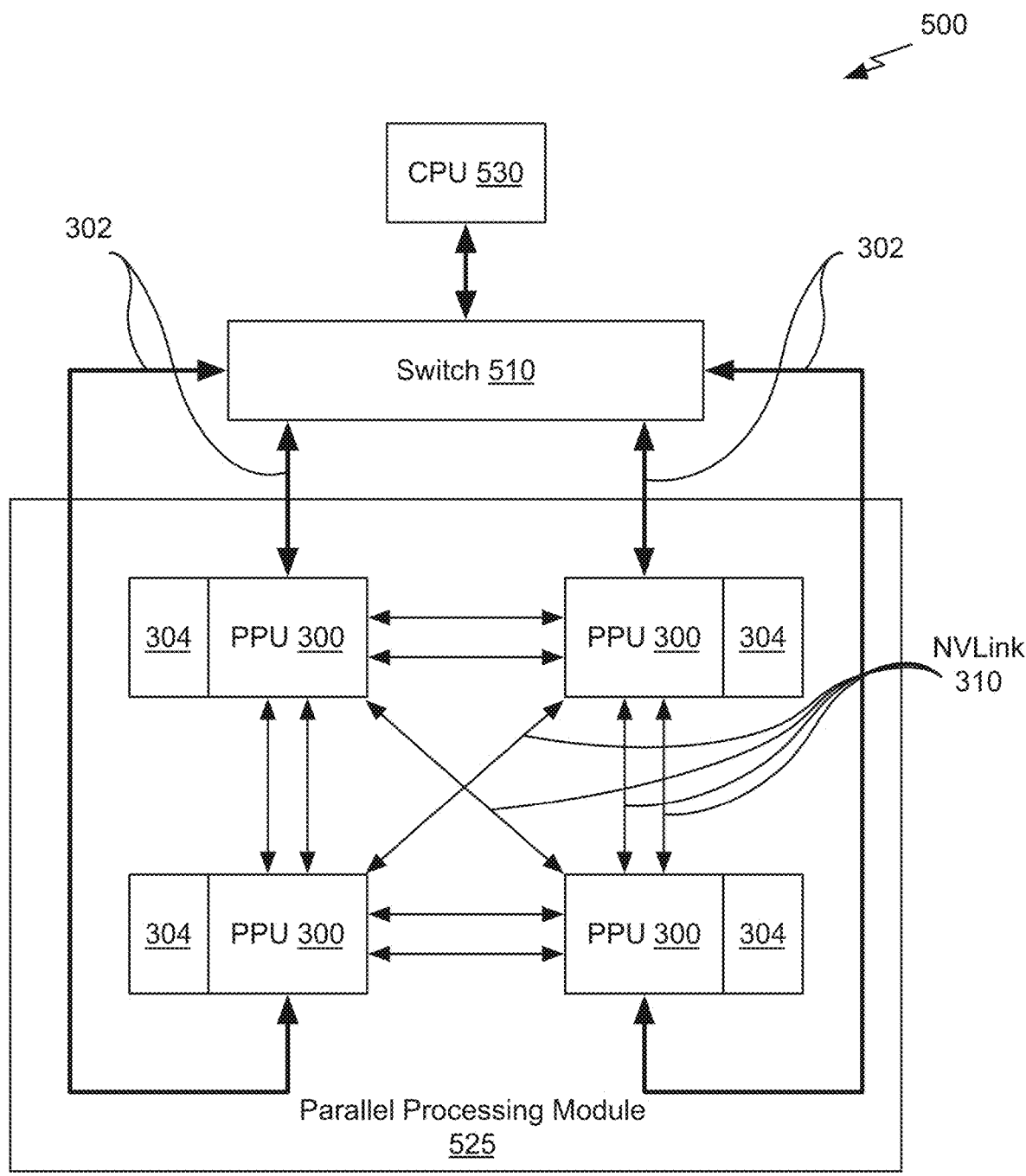
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 135 shown in FIG. 1C and/or the method 200 shown in FIG. 2A. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
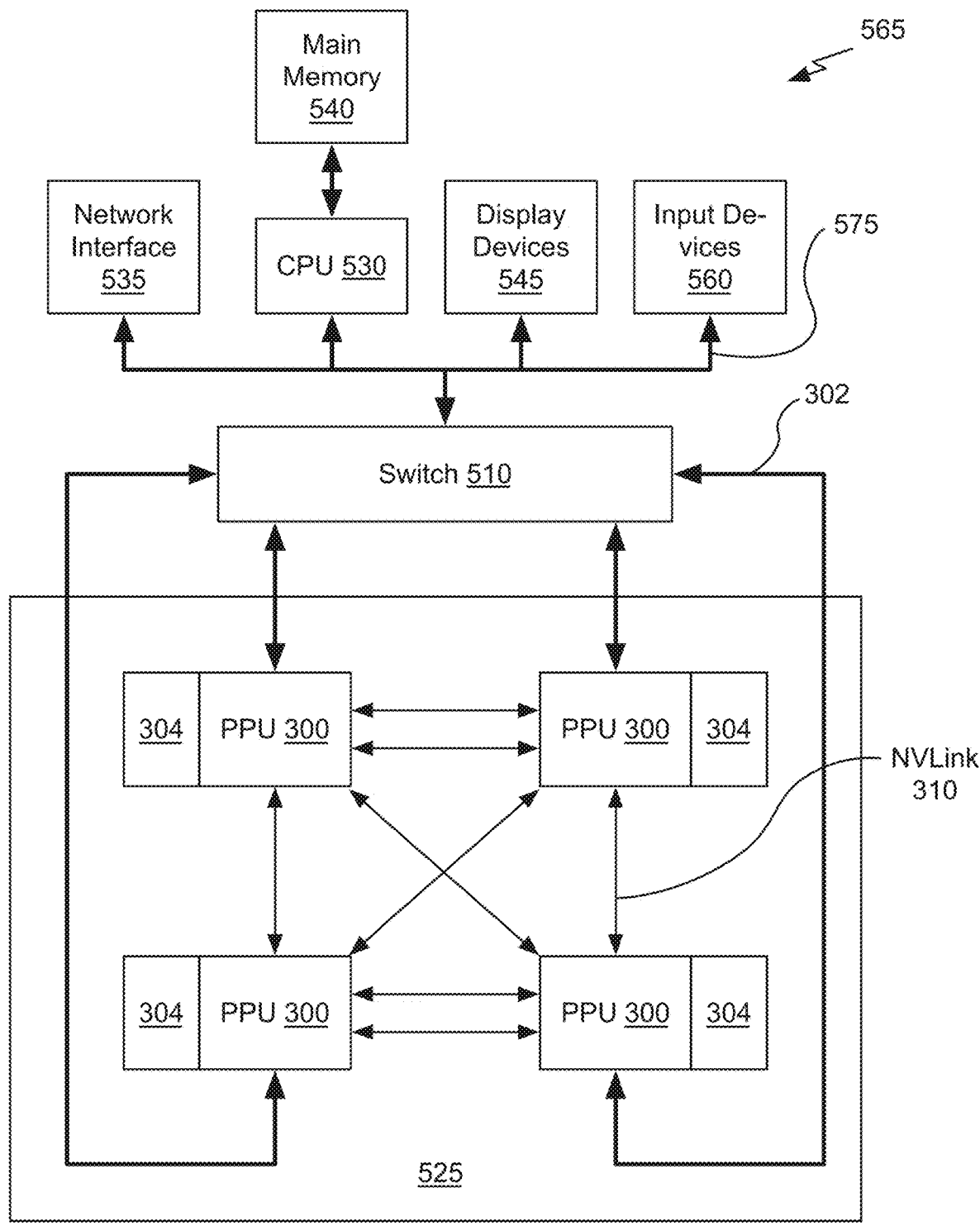
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 135 shown in FIG. 1C and/or the method 200 shown in FIG. 2A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   processing an image of a three-dimensional (3D) scene by an inverse rendering neural network to estimate reflectance properties or geometry properties of the 3D scene;
   computing, by a first encoder neural network, intrinsic features based on the reflectance properties or geometry properties of the 3D scene;

processing the image by a second encoder neural network to produce image features;

computing, by a decoder neural network, a residual image representing complex appearance effects of the image based on the image features and the intrinsic features; and combining a rendered image corresponding to the image with the residual image to produce a reconstructed image corresponding to the image.

2. The computer-implemented method of claim 1, wherein the image provided to the second encoder neural network and the inverse rendering neural network is associated with at least one of for gaming, virtual reality, augmented reality, navigation, or robotics.

3. The computer-implemented method of claim 1, wherein the image corresponds to an indoor scene.

4. The computer-implemented method of claim 1, further comprising:

processing an illumination map corresponding to the image, the reflectance properties, and the geometry properties by a closed-form direct renderer to generate the rendered image corresponding to the image; and reducing differences between the reconstructed image and the image.

5. The computer-implemented method of claim 4, wherein parameters of the inverse rendering neural network are adjusted to reduce the differences.

6. The computer-implemented method of claim 4, wherein the illumination map is generated by the inverse rendering neural network.

7. The computer-implemented method of claim 1, wherein parameters of the first encoder neural network, the second encoder neural network, and the decoder neural network are maintained while the parameters of the inverse rendering neural network are adjusted.

8. The computer-implemented method of claim 1, further comprising, before processing the image, training the inverse rendering neural network using a labeled synthetic training dataset.

9. The computer-implemented method of claim 1, further comprising before processing the image, training the inverse rendering neural network using a labeled training dataset including sparse relative reflectance values determined by humans.

10. The computer-implemented method of claim 1, wherein the geometry properties are defined by surface normal vectors for each pixel in the image estimated by the inverse rendering neural network.

11. The computer-implemented method of claim 1, wherein the reflectance properties are defined by albedo data for each pixel in the image estimated by the inverse rendering neural network.

12. The computer-implemented method of claim 1, wherein the complex appearance effects include one or more of near-field lighting effects, cast shadows, and inter-reflections.

13. The computer-implemented method of claim 1, further comprising training the first encoder neural network, the second encoder neural network, and the decoder neural network using a labeled synthetic training dataset.

14. An inverse rendering training system, comprising:

an inverse rendering neural network configured to process an image of a three-dimensional (3D) scene to estimate reflectance properties or geometry properties of the 3D scene;

a first encoder neural network configured to compute intrinsic features based on the reflectance properties or geometry properties of the 3D scene;

a second encoder neural network configured to process the image to produce image features; and a decoder neural network configured to compute a residual image representing complex appearance effects of the image based on the image features and the intrinsic features, wherein a rendered image is combined with the residual image to produce a reconstructed image corresponding to the image.

15. The system of claim 14, wherein the image provided to the second encoder neural network and the inverse rendering neural network is associated with at least one of for gaming, virtual reality, augmented reality, navigation, or robotics.

16. The system of claim 14, further comprising:

a closed-form direct renderer configured to process an illumination map corresponding to the image, the reflectance properties, and the geometry properties to generate the rendered image corresponding to the image; and a loss function unit configured to reduce differences between the reconstructed image and the image.

17. The system of claim 14, wherein the complex appearance effects include one or more of near-field lighting effects, cast shadows, and inter-reflections.

18. A non-transitory computer-readable media storing computer instructions for inverse rendering that, when executed by one or more processors, cause the one or more processors to perform the steps of:

processing an image of a three-dimensional (3D) scene by an inverse rendering neural network to estimate reflectance properties or geometry properties of the 3D scene;

computing, by a first encoder neural network, intrinsic features based on the reflectance properties or geometry properties of the 3D scene;

processing the image by a second encoder neural network to produce image features;

computing, by a decoder neural network, a residual image representing complex appearance effects of the image based on the image features and the intrinsic features; and combining the rendered image with the residual image to produce a reconstructed image corresponding to the image.

19. The non-transitory computer-readable media of claim 18, further comprising:

processing an illumination map corresponding to the image, the reflectance properties, and the geometry properties by a closed-form direct renderer to generate a rendered image corresponding to the image; and reducing differences between the reconstructed image and the image.

20. The non-transitory computer-readable media of claim 18, wherein the complex appearance effects include one or more of near-field lighting effects, cast shadows, and inter-reflections.

* * * * *